US009195863B2

(12) United States Patent
Grziwok et al.

(10) Patent No.: US 9,195,863 B2
(45) Date of Patent: Nov. 24, 2015

(54) MAGNETIC CARD READER MOUNTING SYSTEM

(71) Applicant: Lilitab LLC, San Rafael, CA (US)

(72) Inventors: Bryan Rudolf Grziwok, Berkeley, CA (US); Adam Scott Aronson, San Rafael, CA (US)

(73) Assignee: Lilitab LLC, San Rafael, CA (US)

( * ) Notice: Subject to any disclaimer, the term of this patent is extended or adjusted under 35 U.S.C. 154(b) by 0 days.

(21) Appl. No.: 14/211,191

(22) Filed: Mar. 14, 2014

(65) Prior Publication Data
US 2014/0263647 A1  Sep. 18, 2014

Related U.S. Application Data

(60) Provisional application No. 61/801,889, filed on Mar. 15, 2013.

(51) Int. Cl.
*G06K 7/08* (2006.01)
(52) U.S. Cl.
CPC .................... *G06K 7/084* (2013.01)
(58) Field of Classification Search
CPC ................ G06K 2017/0067; G06K 7/0004; G06Q 20/20; G07F 19/201; G07F 7/08; G07F 7/0886; G07G 1/0018
USPC ................................................ 235/380, 449
See application file for complete search history.

(56) References Cited

U.S. PATENT DOCUMENTS

| | | | |
|---|---|---|---|
| 6,234,389 B1 * | 5/2001 | Valliani et al. | 235/380 |
| 6,379,073 B1 | 4/2002 | Yoo | |
| 7,218,510 B2 | 5/2007 | Hillman | |
| 7,316,377 B2 | 1/2008 | Smed | |
| 7,694,922 B2 | 4/2010 | Kim | |
| 7,850,074 B2 * | 12/2010 | Henry | 235/380 |
| 7,889,489 B2 * | 2/2011 | Richardson et al. | 361/679.32 |
| 8,231,055 B2 * | 7/2012 | Wen | 235/449 |
| 2005/0247787 A1 * | 11/2005 | Von Mueller et al. | 235/449 |
| 2012/0061542 A1 | 3/2012 | Bostater | |

OTHER PUBLICATIONS http://armodilo.com/products/armotwist, Armodilo ArmoTwist, 2013, downloaded Sep. 25, 2013, 3 pages.
http://www.ipadenclosures.com/ipad_kiosk_enclosure/ipad_table_mounts_stands/axis-ipad-table-mount, iPad Enclosures LLC, Axis iPad Mount, 2013, downloaded Sep. 25, 2013, 4 pages.

* cited by examiner

*Primary Examiner* — Seung Lee
(74) *Attorney, Agent, or Firm* — Fish & Richardson P.C.

(57) ABSTRACT

One example of a magnetic card reader mounting system includes a card reader mounting system for attaching to a kiosk in which a tablet computer is housed. The card reader mounting system includes a swipe path accessory panel, a swipe path plate, and a reader head subassembly. The swipe path plate and the reader head subassembly are secured to the swipe accessory panel. The system also includes a swipe cap secured to the reader head subassembly, wherein the swipe path plate and the reader head subassembly are configurable to support a plurality of reader head geometries.

8 Claims, 7 Drawing Sheets

MAGNETIC CARD READER MOUNTING SYSTEM

CROSS REFERENCE TO RELATED APPLICATIONS

This disclosure claims the benefit of the priority of U.S. Provisional Application Ser. No. 61/801,889, filed Mar. 15, 2013, and entitled "Magnetic Card Reader Mounting System", which is incorporated herein by reference in its entirety.

TECHNICAL FIELD

This disclosure relates to a magnetic card reader mounting system that, for example, enables the use of different card readers with the same secure electronic device enclosure.

BACKGROUND

Secure device enclosures (also referred to as "kiosks") often are used to encapsulate, and thus secure, devices such as tablet computers. Such kiosks sometimes include magnetic card readers, for example, credit card readers, which read information encoded on a magnetic stripe formed on the card. Different businesses may use different back-end payment processors, each of which is often associated and linked with a specific brand of magnetic card reader, which implements processor-specific security algorithms at the time of transaction. Consequently, depending on the circumstance, some businesses may require a certain brand of card reader connected to a kiosk, while other businesses may require a different brand of card reader.

SUMMARY

This disclosure relates to a card reader mounting system which enables the use of different card readers within the same secure electronic device enclosure. Among other advantages, the card reader mounting system described here enables a kiosk to support a variety of magnetic card readers from different manufacturers.

Among other ways, compatibility with a variety of different types of magnetic card readers may be achieved through the use of a system of intermediate support panels. These interchangeable panels allow the electronic device enclosure to support within it a variety of card reader solutions without modification to the form of the external enclosure Details of one or more implementations of the subject matter described in this specification are set forth in the accompanying drawings and the description below. Other features, aspects, and potential advantages will become apparent from the description, the drawings, and the claims.

BRIEF DESCRIPTION OF THE DRAWINGS

Like reference numbers and designations in the various drawings indicate like elements.

DETAILED DESCRIPTION

This disclosure relates to a card reader mounting system which enables the use of different card readers within the same secure electronic device enclosure. The card reader mounting system described here can be used with intermediate panels to support multiple alternate reader head configurations within a unified enclosure design. The system of panels that together make up the card reader accessory assembly disclosed here can support both standard 90 mm card reader rails as well as discrete mounted reader heads, along with the associated electronics. The card reader mounting system can include one or more configurable internal panels which support the reader head in the proper position relative to the enclosure geometry in general and swipe path in particular. The card reader mounting system can also include a provision for supporting an illuminated user interface (UI) and appropriate graphic labeling.

Implementations of the subject matter described here can provide one or more of the following potential advantages. The card reader mounting system can offer the ability to mount various card reader solutions within the same physical enclosure, allowing the customer to use their existing payment processor without changes to the characteristic aesthetic design of the enclosure. The system can allow business to deploy new point-of-sale (POS) equipment, which may include a tablet computer housed within a secure enclosure, without changing their payment processor. The system can allow the enclosure to support reader electronics packages from multiple manufacturers without changing the external appearance of the kiosk. The system can minimize the number (and cost) of unique parts required to support each reader electronics package. The system can facilitate compatibility through the use of a system of intermediate support panels. These interchangeable panels can allow the electronic device enclosure, itself of specific and recognizable design, to support within it, a variety of card reader solutions without modification to the form of the external enclosure.

Figure 1:
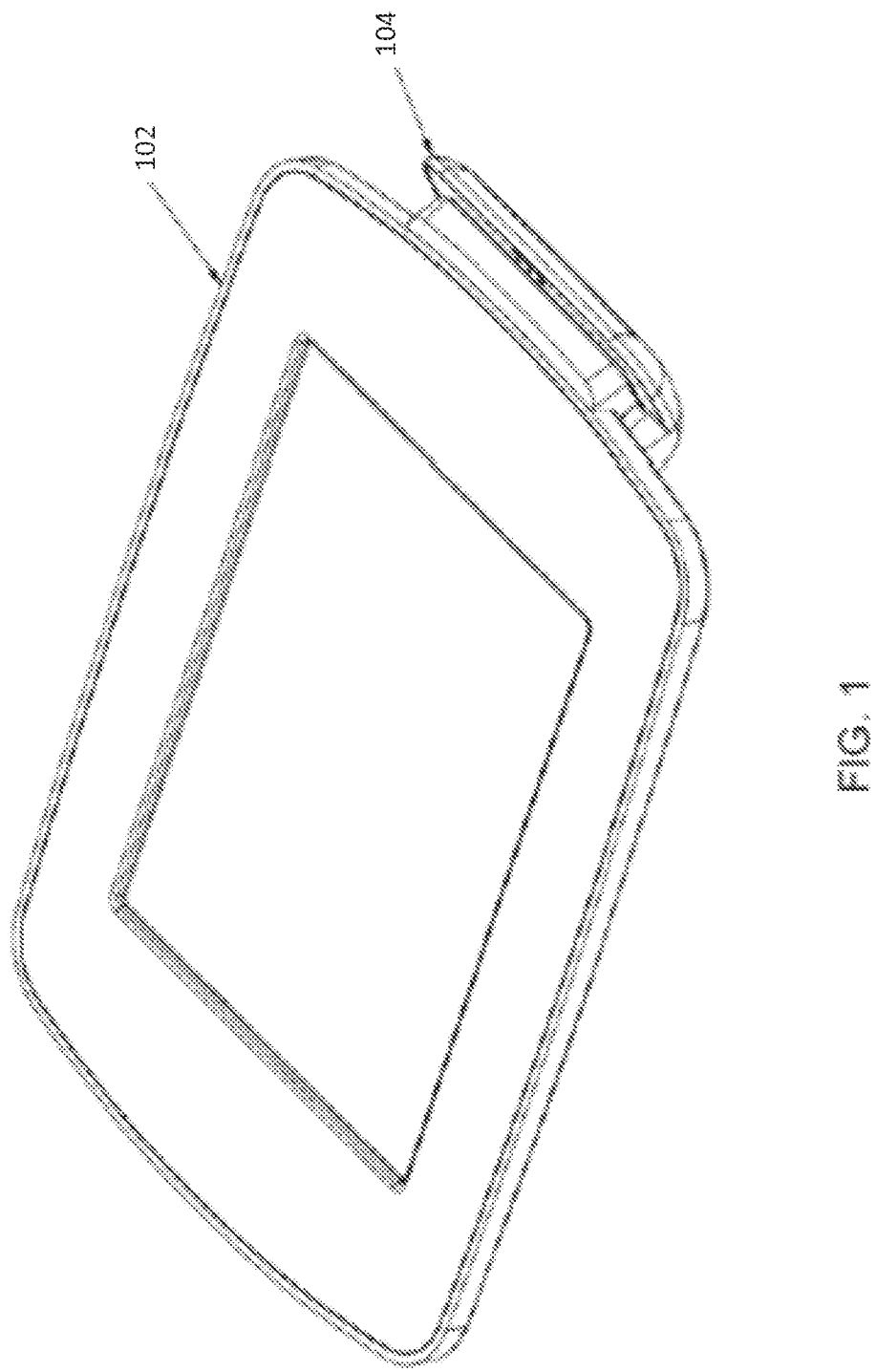
FIG. 1 illustrates an example card reader mounting system.

FIG. 1 illustrates an example card reader mounting system 104 attached to a kiosk 100.

Figure 2:
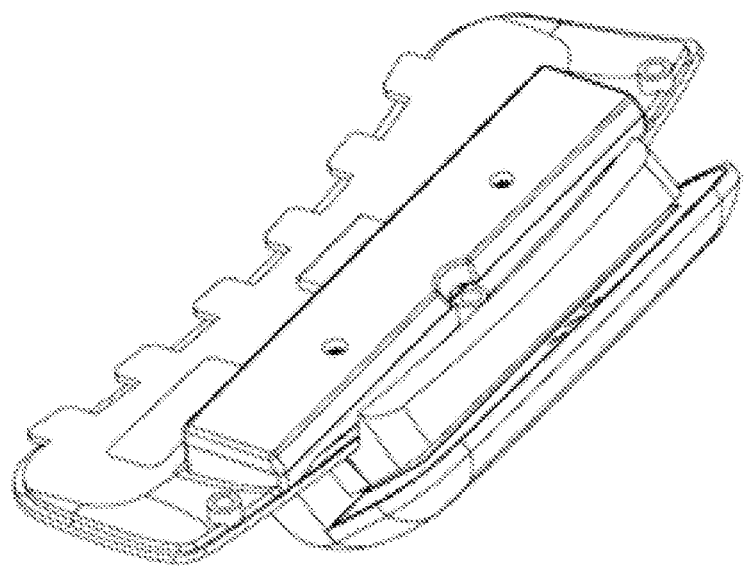
FIG. 2 illustrates a detail view of a card reader accessory.

FIG. 2 illustrates a detail view of a card reader accessory. The card reader panel is can be mounted on either the left of right side of the kiosk.

Figure 3:
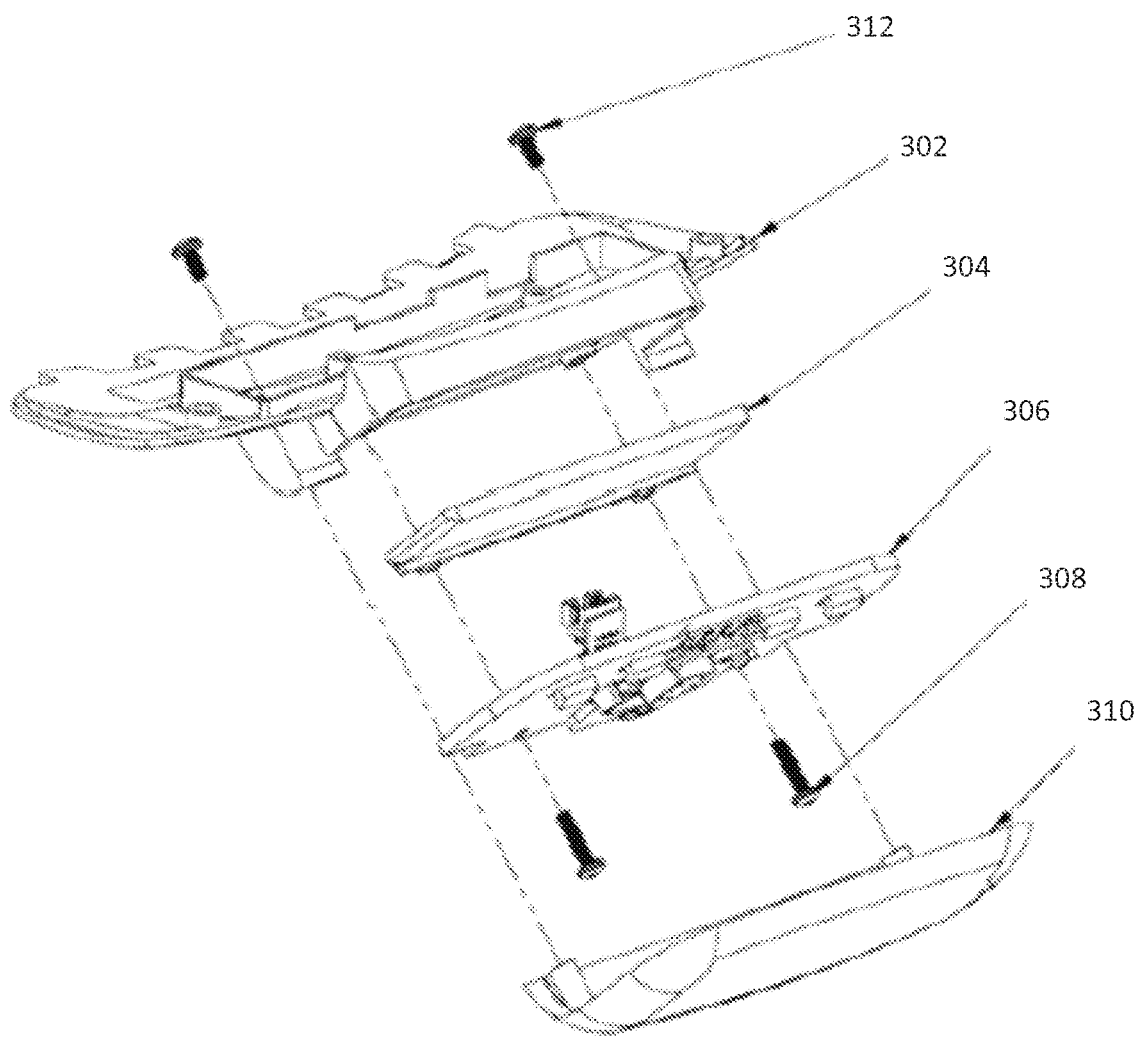
FIG. 3 illustrates an assembly of a reader head compartment in some implementations of the card reader assembly.
Figure 4:
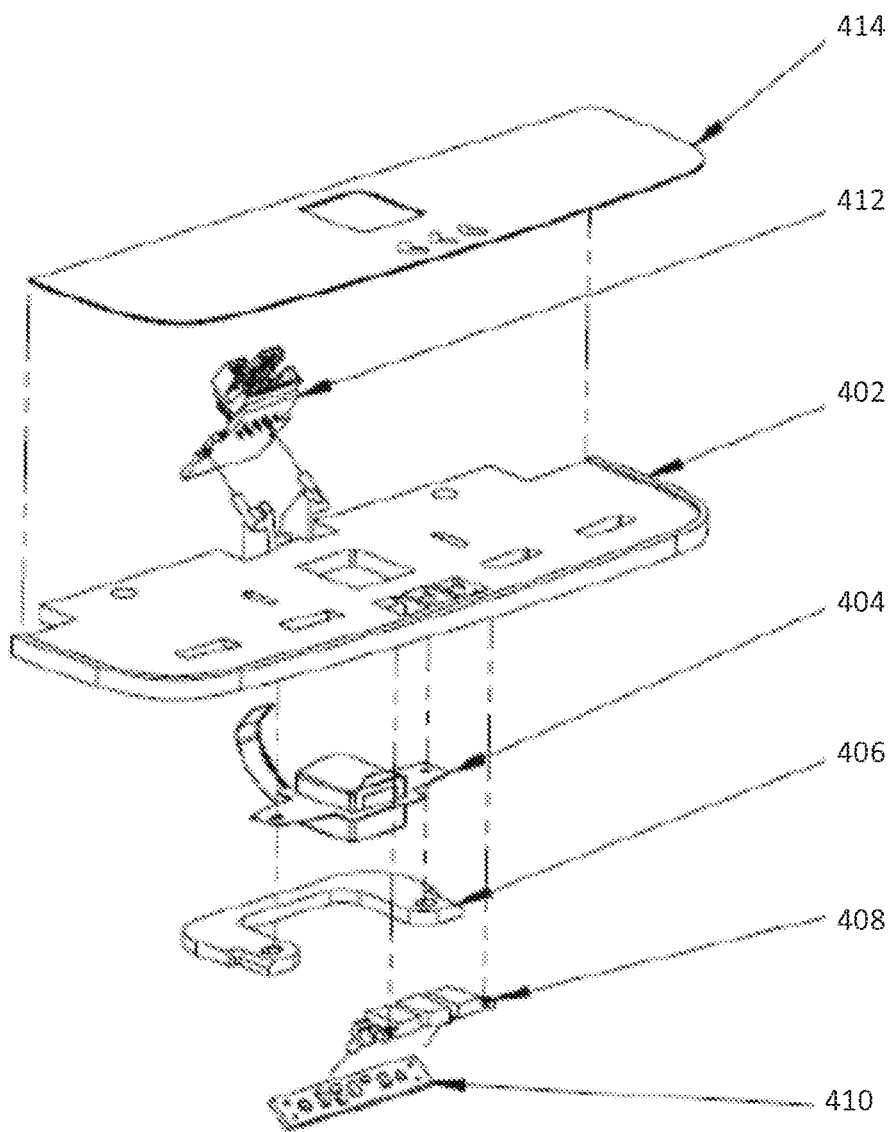
FIG. 4 illustrates an example assembly of a reader head subassembly as shown in FIG. 3.
Figure 5:
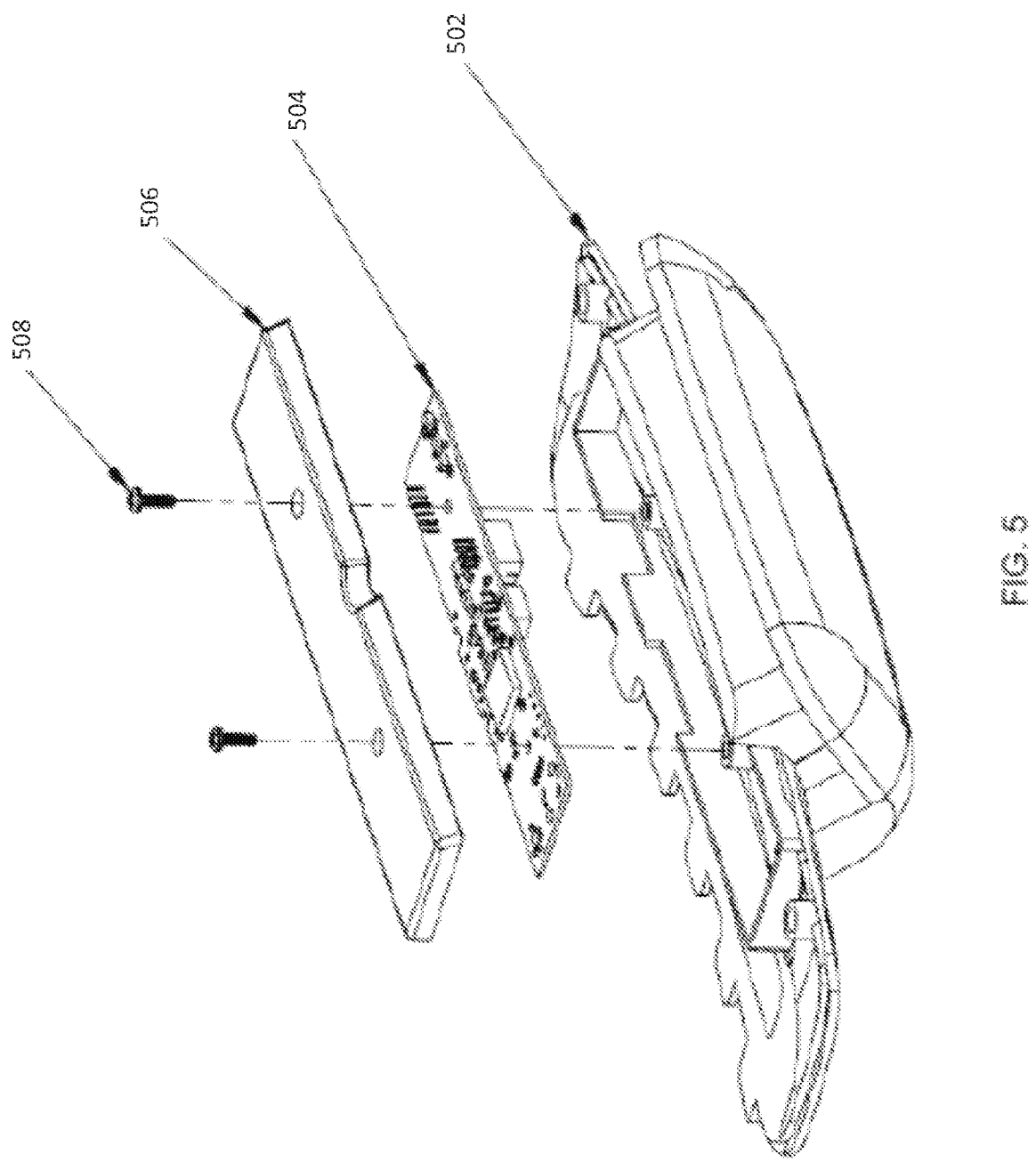
FIG. 5 illustrates a complete assembly of the card reader accessory assembly.
Figure 6:
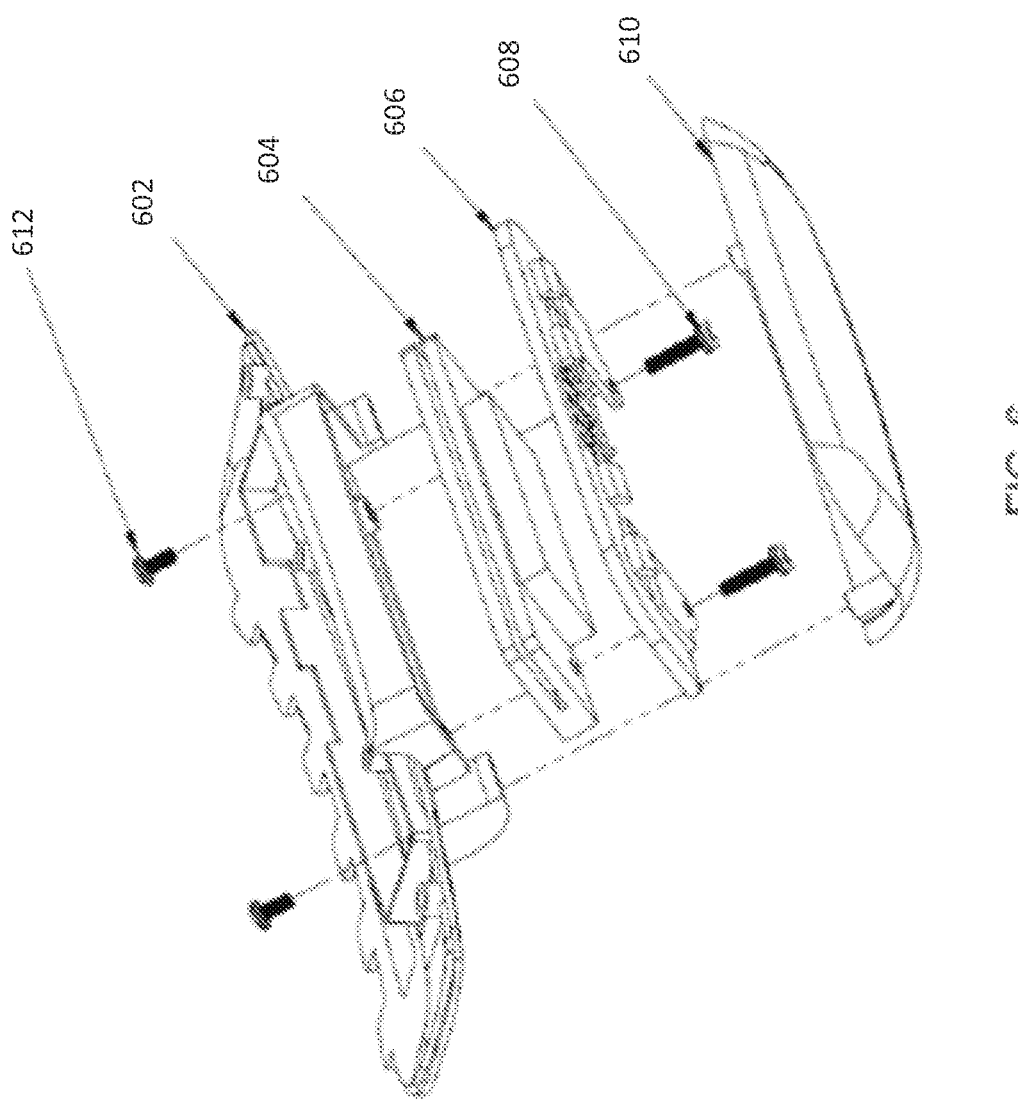
FIG. 6 illustrates a complete assembly of the card reader accessory assembly.
Figure 7:
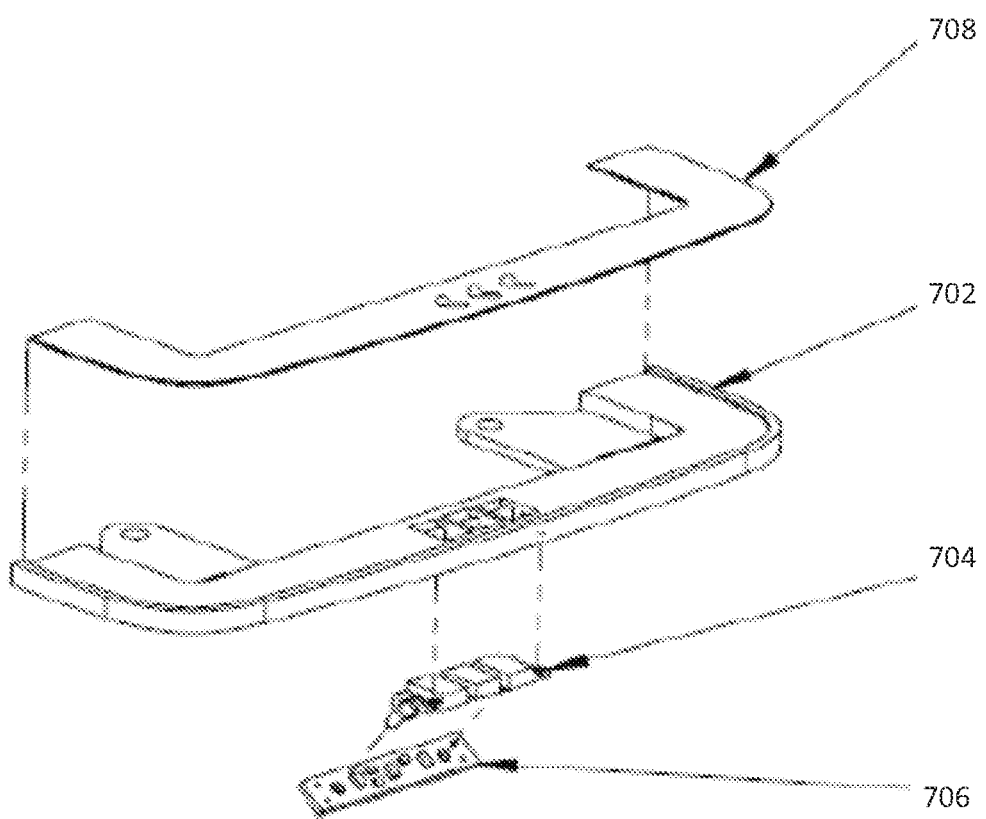
FIG. 7 illustrates another assembly of the reader Head subassembly as shown in FIG. 6.

FIGS. 3-5 shows one example of how the card reader panel shown in FIG. 2 might be internally configured to accommodate a first make and model of card reader. FIGS. 6-7 shows a second example of how the card reader panel shown in FIG. 2 might be internally configured to accommodate a second make and model of card reader.

FIG. 3 illustrates an assembly of a reader head compartment in some implementations of the card reader assembly. In this configuration, the Swipe Path Plate 304 and Reader Head Subassembly 306 are secured to the Swipe Accessory Panel 302 with Screws 308. The Swipe Cap 310 is then secured over the Reader Head Assembly 306 with two Screws 312. The Reader Head Subassembly 306 and the Swipe Path Plate 304 are each configurable to support a variety of different Reader Head geometries without material change to the Swipe Accessory Panel 302 or the Swipe Cap 310, thus allowing the external form to be unaffected by the change in Reader Head Components.

FIG. 4 illustrates an example assembly of a reader head subassembly as shown in FIG. 3. For this version of the Reader Head Subassembly, the Reader Head 404 is mounted to the Reader Head Plate 402 with the Head Retainer 406. The Lightpipe 408 and LED Board 410 are also mounted into the Reader Head Plate 402. The Lightpipe 408 and LED Board 410 may be omitted if a given Reader Electronics Package does not support an illuminated user interface. Next an Extender Board 412 is mounted to the Reader Head Plate 402, providing a blind interconnect to the Swipe Electronics Board (see FIG. 5). Finally, a Label 414 is placed over the Reader Head Plate 402, providing appropriate graphics to indicate how and when the user should swipe their card through the apparatus.

FIG. 5 illustrates the components of an example card reader accessory assembly. After assembly of the Reader Head Compartment 502 as shown in FIG. 3, the Reader Head Electronics 504 are placed into the assembly, connecting to the Extender Board (see FIG. 4). The Electronics Cover 506 is then put in place and secured with Screws 508. The modular nature of the assembly allows the Reader Head Electronics to be matched to the Reader Head, as long as the mounting points and overall board size meet enclosure specifications.

FIG. 6 illustrates a complete assembly of the card reader accessory assembly. In this configuration, a standard 90 mm Rail 604 is mounted into the swipe path, with a configuration-specific Reader Head Subassembly 606. As in FIG. 3, these items are secured to the Swipe Accessory Panel (1) with Screws 608. The Swipe Cap 610 is then secured over the Reader Head Assembly 606 with two additional Screws 612. Even though the Reader Head Components differ from those shown in FIG. 3, the use of intermediate plates as part of the mounting assembly allows alternate reader head configurations to be supported without material change to the Swipe Accessory Panel 602 or the Swipe Cap 610. This allows the external form to be unaffected by the change in Reader Head Components.

FIG. 7 illustrates another assembly of the reader Head subassembly as shown in FIG. 6. For this version of the Reader Head Subassembly, the reader is incorporated into the 90 mm Rail shown in FIG. 6. The Reader Head Plate 702 holds and supports the rail. Consistent with FIG. 4, the Lightpipe 708 and LED Board 710 are mounted into the Reader Head Plate 702, and similarly, a Label 714 is put in place, providing appropriate graphics to indicate how and when the user should swipe their card through the apparatus.

Certain aspects of the subject matter described here can be implemented as a system of panels which facilitates the use of multiple alternative magnetic card reader electronics packages within a particular secure enclosure for tablet computers. Certain aspects of the subject matter described here can be implemented as a panel-mounted card reader accessory described with references to the figures included here. Certain aspects of the subject matter described here can be implemented as a panel-mounted card reader accessory assembled as described here, and which is interchangeable with the card reader accessory described above. Certain aspects of the subject matter described here can be implemented as a panel-mounted card reader accessory which incorporates an illuminated user interface. Certain aspects of the subject matter described here can be implemented to use a panel-mounted card reader accessory as part of a secure tablet kiosk system.

A number of implementations of the invention have been described. Nevertheless, it will be understood that various modifications can be made without departing from the spirit and scope of the invention.

What is claimed is:

1. A card reader mounting system for attaching to a kiosk in which a tablet computer is housed, the card reader mounting system comprising:
    a swipe path accessory panel;
    a swipe path plate;
    a reader head subassembly comprising a reader head plate, a head retainer and a reader head mounted to the reader head plate with the head retainer, wherein the swipe path plate and the reader head subassembly are secured to the swipe accessory panel; and
    a swipe cap secured to the reader head subassembly, wherein the swipe path plate and the reader head subassembly are configurable to support a plurality of reader head geometries.

2. The system of claim 1, further comprising:
    a light emitting diode board mounted to the reader head subassembly; and
    a lightpipe mounted to the reader head subassembly.

3. The system of claim 1, further comprising an extender board mounted to the reader head plate to provide a blind interconnect to a swipe electronics board.

4. The system of claim 1, further comprising a label placed over the reader head plate.

5. The system of claim 1, further comprising:
    reader head electronics positioned in the reader head subassembly, the reader head electronics configured to be connected to an extender board; and
    a cover positioned on the reader head electronics.

6. The system of claim 1, further comprising a rail mounted to a swipe path with the reader head subassembly.

7. The system of claim 6, wherein the rail is a 90 mm rail.

8. A card reader mounting system for attaching to a kiosk in which a tablet computer is housed, the card reader mounting system comprising:
    a swipe path accessory panel to mount to the kiosk;
    a configurable reader head subassembly secured to the swipe path accessory panel, the configurable reader head subassembly configured to interchangeably support a first configuration and a second configuration, the first configuration comprising a swipe path plate, a swipe path, a reader head and a retainer clip, the second configuration comprising a reader head rail; and
    a swipe cap secured to the reader head subassembly.

* * * * *